United States Patent
Koga et al.

(10) Patent No.: US 7,940,883 B1
(45) Date of Patent: May 10, 2011

(54) FUEL ASSEMBLY (75) Inventors: Tomonari Koga, Abiko (JP); Satoshi Nishimura, Komae (JP); Izumi Kinoshita, Komae (JP); Yasushi Tsuboi, Yokohama (JP); Masatoshi Nakagawa, Yokohama (JP)

(73) Assignees: Kabushiki Kaisha Toshiba, Tokyo (JP); Central Research Institute of Electric Power Industry, Tokyo (JP)

( * ) Notice: Subject to any disclaimer, the term of this patent is extended or adjusted under 35 U.S.C. 154(b) by 730 days.

(21) Appl. No.: 11/616,119

(22) Filed: Dec. 26, 2006

(30) Foreign Application Priority Data

Dec. 27, 2005 (JP) .................................. 2005-374775

(51) Int. Cl.
*G21C 3/34* (2006.01)
(52) U.S. Cl. .......................... 376/438; 376/399; 376/442
(58) Field of Classification Search .................. 376/438, 376/442–444, 399
See application file for complete search history.

(56) References Cited

U.S. PATENT DOCUMENTS

| 2,902,422 | A | * | 9/1959 | Hutter ............................ 376/434 |
| 3,607,642 | A | * | 9/1971 | Murdock et al. .............. 376/447 |
| 3,629,066 | A | * | 12/1971 | Andersson et al. ........... 376/436 |
| 3,677,893 | A | * | 7/1972 | Huebotter et al. ............ 376/444 |
| 3,892,625 | A | * | 7/1975 | Patterson ...................... 376/176 |
| 3,997,395 | A | * | 12/1976 | Cayol et al. ................... 376/436 |
| 4,097,331 | A | * | 6/1978 | Betten ........................... 376/444 |
| 4,522,781 | A | * | 6/1985 | Schluderberg ................ 376/427 |
| 4,663,117 | A | * | 5/1987 | Jolly et al. .................... 376/442 |
| 4,663,118 | A | * | 5/1987 | Nelson .......................... 376/445 |
| 4,818,479 | A | * | 4/1989 | Christiansen et al. ........ 376/442 |

FOREIGN PATENT DOCUMENTS

| JP | 48-9197 | 2/1973 |
| JP | 48-84295 | 11/1973 |
| JP | 57-175287 | 10/1982 |
| JP | 60230090 | * 4/1984 |
| JP | 60-230090 | 11/1985 |

OTHER PUBLICATIONS

Merriam-Webster's Collegiate Dictionary, Tenth edition, 1998, p. 553.*
Definition of "suppress", http://dictionary.reference.com, accessed Jun. 21, 2010.*

* cited by examiner

*Primary Examiner* — Rick Palabrica
(74) *Attorney, Agent, or Firm* — Oblon, Spivak, McClelland, Maier & Neustadt, L.L.P.

(57) ABSTRACT

A fuel assembly is charged in a reactor core of a nuclear reactor using a liquid metal as a coolant and includes a wrapper tube storing a plurality of fuel pins and including an entrance nozzle at a lower end thereof for introducing the coolant and an operation handling head at an upper end thereof, grids for supporting the plurality of fuel pins in the wrapper tube in the radial direction of the wrapper tube, liner tubes inserted in the wrapper tube for fixedly holding the grids in the axial direction of the wrapper tube, and peripheral flow suppressing members disposed in a peripheral flow passage extending between peripherally disposed ones of the fuel pins and the wrapper tube over a length corresponding to a heat generation length, which is a length range in the axial direction of the fuel pins storing a radioactive fuel material.

6 Claims, 7 Drawing Sheets

FIG. 11
PRIOR ART ated example of
FUEL ASSEMBLY

BACKGROUND OF THE INVENTION

1. Field of the Invention

The present invention relates to a fuel assembly for a small-sized nuclear reactor using a coolant such as a liquid metal, and particularly, to a fuel assembly including a plurality of grids provided to a fuel bundle.

2. Related Art

Generally, in the nuclear reactor of the type mentioned above, a fuel assembly is supported in a reactor core while being attached to a support member. In a nuclear reactor using a coolant such as a liquid metal, the coolant is circulated around a plurality of fuel pins included in the fuel assembly supported in the reactor core. In this case, if the nuclear reactor is small-sized, the fuel assembly is configured to store the fuel pins in a wrapper tube to enable the circulation of the coolant with no need for a drive source. The wrapper tube includes an entrance nozzle at a lower end thereof for introducing the coolant, and an operation handling head at an upper end thereof.

The wrapper tube includes therein grids for supporting the fuel pins in the radial direction of the wrapper tube, and liner tubes inserted in the wrapper tube for fixedly holding the respective grids in the axial direction of the wrapper tube. The intervals in the radial direction of the fuel pins are kept by the grids. Meanwhile, the intervals in the axial direction of the grids are kept by a tie rod, the liner tubes, or the like (see Japanese Unexamined Patent Application Publication No. HEI 6-174882, for example).

Figure 8:
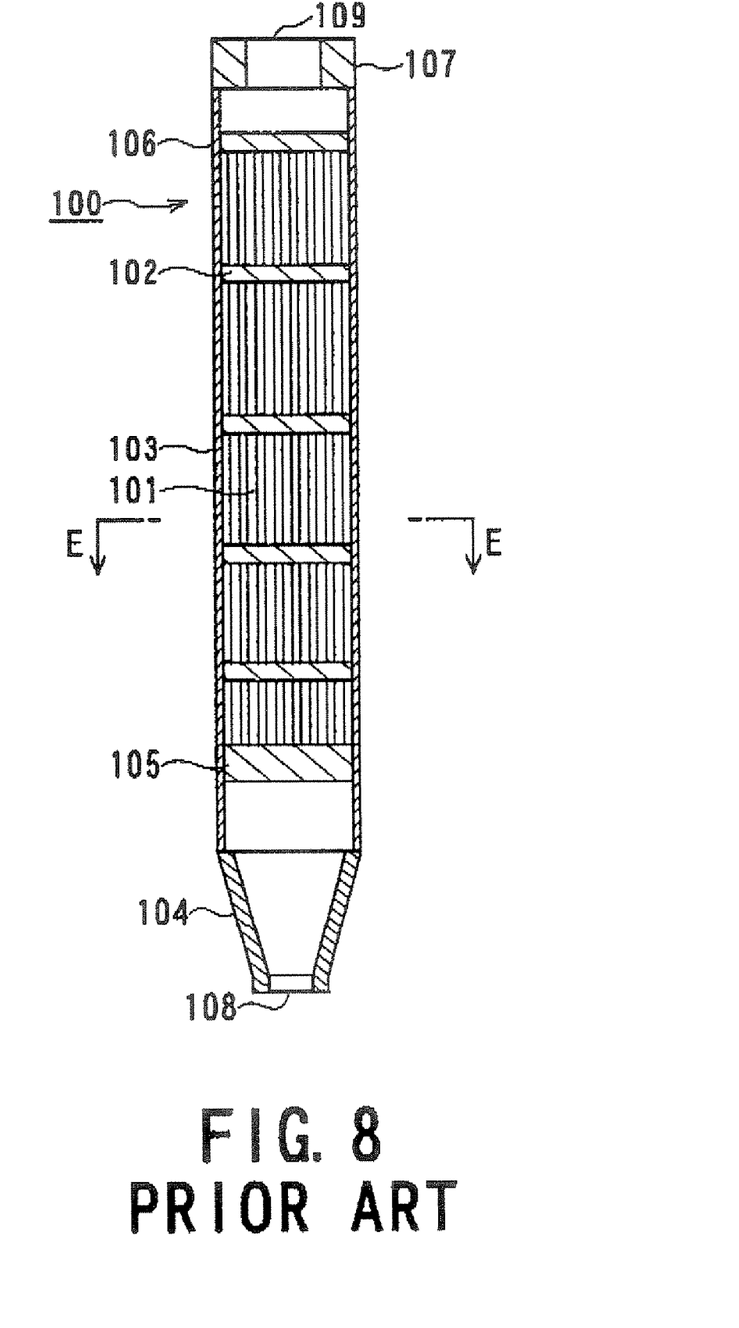
FIG. 8 is a schematic view illustrating a fuel assembly of a conventional example.
Figure 9:
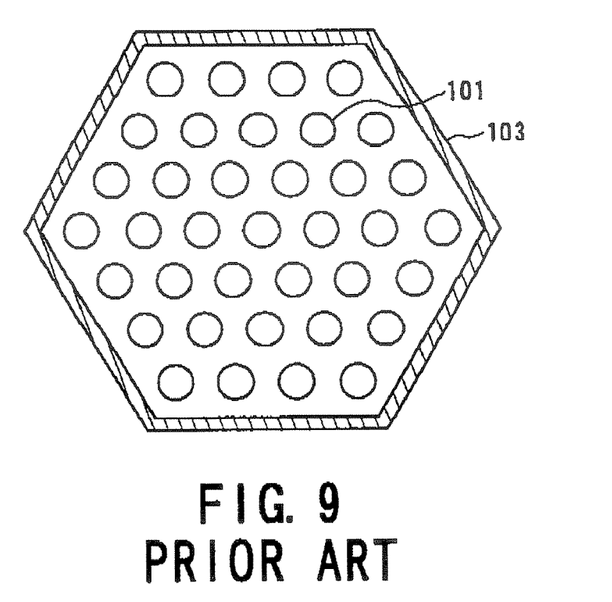
FIG. 9 is a cross-sectional view of FIG. 8 taken along the line IX-IX.

With reference to FIGS. 8 to 11, a conventional example of a fuel assembly 100 will be described. In FIGS. 8 and 9, a plurality of fuel pins 101 are incorporated in a wrapper tube 103, with the pin intervals in the radial direction of the fuel pins 101 kept by grids 102. Each of the fuel pins 101 is fixed at a lower portion thereof by a lower pin support plate 105 and at an upper portion thereof by an upper pin support plate 106. From a coolant inlet 108 of an entrance nozzle 104 provided at a lower position, the coolant such as a liquid metal flows in and moves upward. Then, the coolant flows out from a coolant outlet 109 of a handling head 107.

Figure 10:
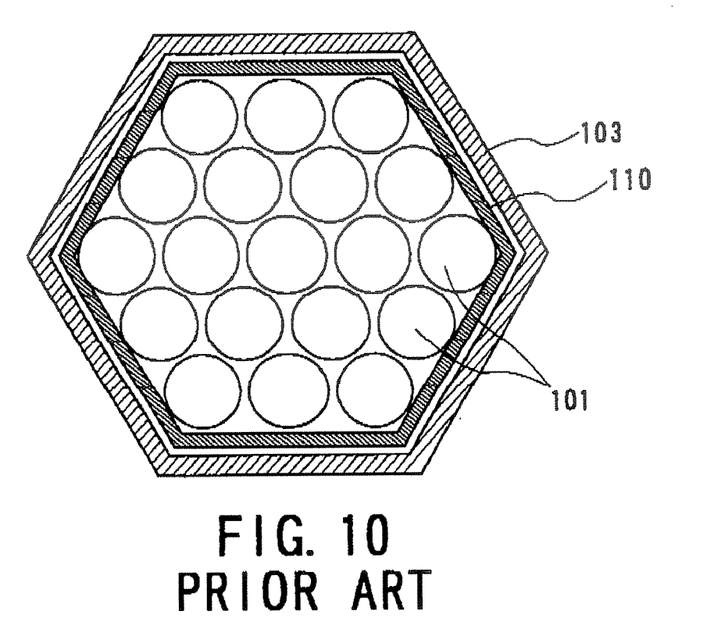
FIG. 10 is a transverse cross-sectional view illustrating the fuel assembly of the conventional example.

In the thus configured fuel assembly 100, ring-shaped grids are used as the grids 102 having a low pressure drop. Further, as illustrated in FIG. 10, liner tubes 110 each formed by a thin hexagonal tube are provided on the inner surface side of the wrapper tube 103, i.e., outside a fuel bundle such that the liner tubes 110 and the grids 102 are alternately stacked. Thereby, the intervals in the axial direction of the grids 102 are kept.

Figure 11:
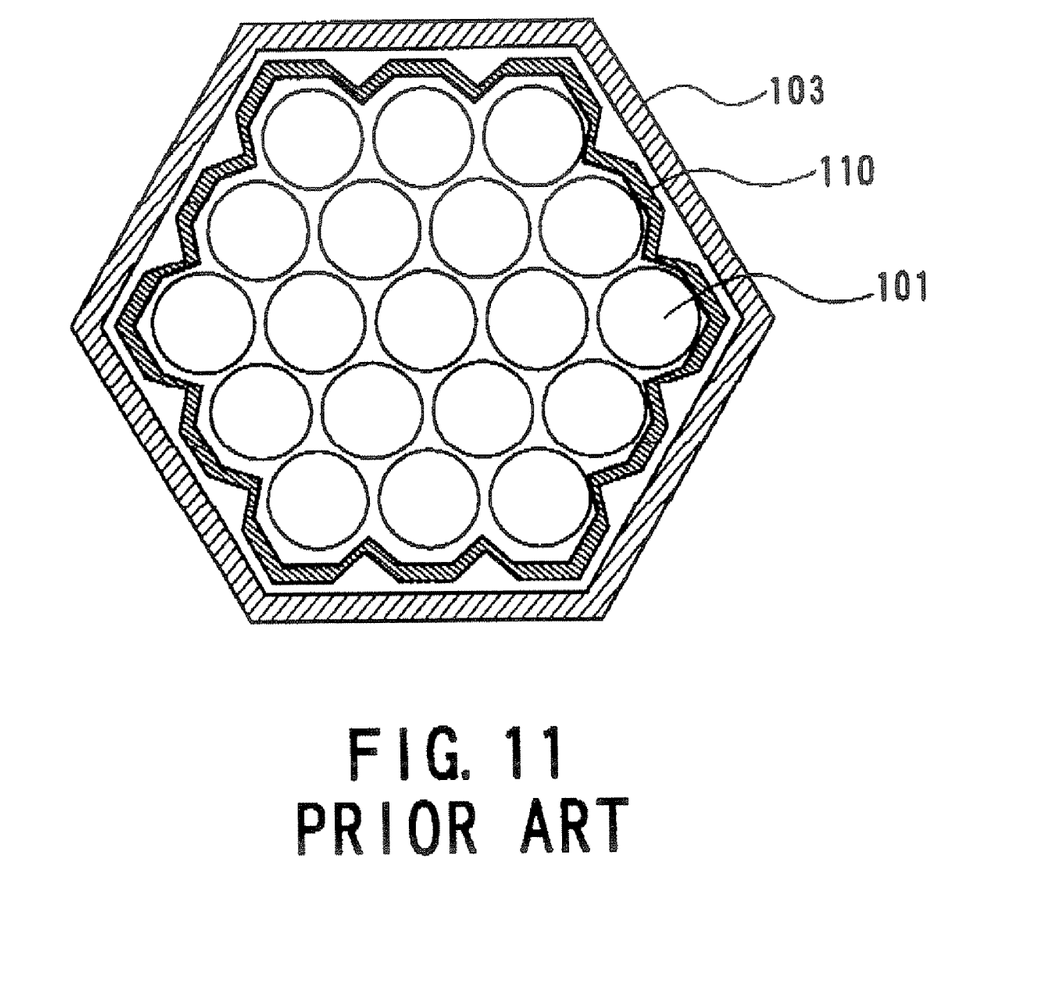
FIG. 11 is a transverse cross-sectional view illustrating a fuel assembly of another conventional example.

Since the flow passage area around the fuel bundle is large, the cladding temperature of the fuel in a central area of the fuel bundle becomes relatively high. Therefore, there arises a need to keep the cladding temperature equal to or lower than a cladding temperature limit, and thus the thermal efficiency is decreased. To suppress this phenomenon, as illustrated in FIG. 11, there has been known a technique of providing the liner tubes 110 with peripheral flow preventing projections, which are formed by bending peripheral walls of the liner tubes 110.

As described above, there has been proposed in the conventional fuel assembly to provide the liner tubes with the peripheral flow preventing projections formed by bending the peripheral walls of the liner tubes, for example. According to the proposal, however, it is not necessarily easy to sufficiently suppress the peripheral flow.

To suppress the peripheral flow in the fuel assembly as much as possible, it is necessary to reduce the flow passage area formed between the wrapper tube and peripherally disposed ones of the fuel pins to be approximately equal to the flow passage area surrounded by other ones of the fuel pins disposed toward the center from the peripherally disposed ones of the fuel pins. Specifically, it is necessary to secure the flow passage area formed between the wrapper tube and the peripherally disposed fuel pins to be approximately equal to the flow passage area surrounded by other ones of the fuel pins disposed in a triangular array inside the peripherally disposed ones of the fuel pins.

SUMMARY OF THE INVENTION

The present invention was conceived in light of the above-described circumferences, and an object of the present invention is to provide a fuel assembly which achieves a high thermal efficiency and a stable lifetime performance by preventing an unnecessary flow of a coolant in a peripheral flow passage formed between peripherally disposed fuel pins and a wrapper tube and by causing the coolant to effectively flow toward interiorly disposed fuel pins.

To achieve the above object, the present invention provides a fuel assembly charged in a reactor core of a nuclear reactor using a liquid metal as a coolant. The fuel assembly includes a wrapper tube, grids, and peripheral flow suppressing members. The wrapper tube, which is vertically disposed, includes an entrance nozzle at a lower end thereof for introducing the coolant and an operation handling head at an upper end thereof, and stores therein a plurality of fuel pins. The grids support the plurality of fuel pins in the wrapper tube in the radial direction of the wrapper tube. The peripheral flow suppressing members, formed by a plurality of blocks, are inserted in the wrapper tube to fixedly hold the grids in the axial direction of the wrapper tube. The peripheral flow suppressing members suppress a flow of the coolant, and are disposed in a peripheral flow passage extending between peripherally disposed ones of the fuel pins and the wrapper tube over a length corresponding to a heat generation length, which is a length range in the axial direction of the fuel pins storing a radioactive fuel material.

In a preferable embodiment of the fuel assembly according to the present invention, each of the peripheral flow suppressing members may be formed by blocks, which are disposed in the peripheral flow passage, and each of which has such a cross section that reduces the flow passage area of the peripheral flow passage to be approximately equal to the flow passage area of a region on the center side from the peripherally disposed ones of the fuel pins. Further, it is preferable that a plurality of the blocks are stacked along the axial direction of the grids, and that groups of the stacked blocks keep relative positions in the axial direction of the grids. Furthermore, the blocks may be disposed in a ring shape to face the inner circumferential surface of the wrapper tube, and a peripheral wall of each of the blocks may be formed with a coolant circulation hole for communicating a coolant flow passage on the inner circumferential side of the block with the peripheral flow passage on the outer circumferential side of the block.

The fuel assembly may further include sleeves disposed to cover outer circumferential portions of the peripherally disposed ones of the fuel pins outside the range of the heat generation length, and to keep relative positions between the grids.

A lower portion of the handling head may be provided with a spring for pressing down one of the sleeves, and downward pressing force of the spring may press and hold the grids and the peripheral flow suppressing members from the above with elastic force via the sleeve.

According to the present invention having the above-described characteristics, the peripheral flow suppressing members are provided in the space extending between the peripherally disposed ones of the fuel pins and the wrapper tube over the length corresponding to the major heat generation length of the fuel pins. Thereby, it is possible to suppress the unnecessary flow of the coolant from being formed in an outer circumferential area in the fuel assembly and also possible to cause the coolant to effectively flow toward the interiorly disposed fuel pins. Accordingly, it is possible to provide a fuel assembly having a high thermal efficiency and a stable lifetime performance.

Further characteristics of the present invention will be made clearer from the following description of embodiments with reference to the attached drawings.

BRIEF DESCRIPTION OF THE DRAWINGS

In the attached drawings.

DESCRIPTION OF THE PREFERRED EMBODIMENTS

An embodiment of a fuel assembly according to the present invention will be described below with reference to FIGS. 1 to 7.

Figure 1:
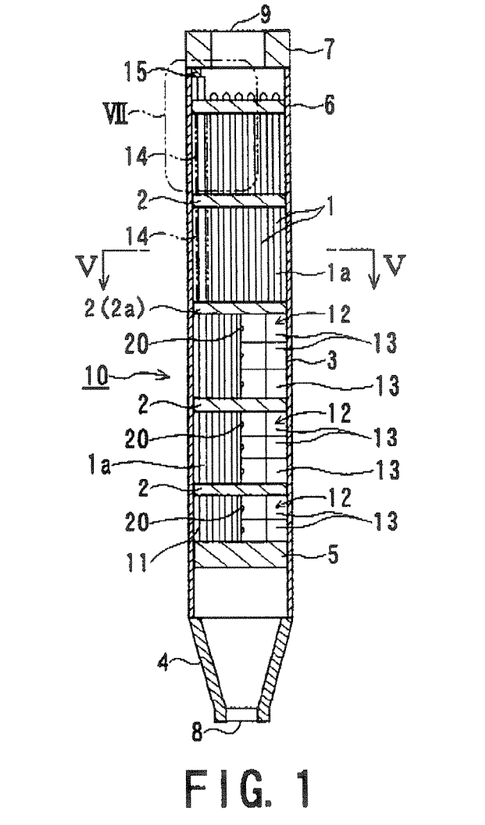
FIG. 1 is a schematic cross-sectional view illustrating an embodiment of a fuel assembly according to the present invention.

A schematic overall configuration of the fuel assembly will be first described with reference to FIG. 1. FIG. 1 is a cross-sectional view illustrating an overall configuration of a fuel assembly 10. The fuel assembly 10 is configured to include an entrance nozzle 4 at a lower end of a vertically disposed wrapper tube 3 for introducing a coolant, to include an operation handling head 7 at an upper end of the wrapper tube 3, and to store a plurality of fuel pins 1 in the wrapper tube 3.

The pin intervals of the fuel pins 1 in the radial direction of the wrapper tube 3 are kept by grids 2, and each of the fuel pins 1 is fixedly supported at a lower end portion thereof by a lower pin support plate 5 and at an upper end portion thereof by an upper pin support plate 6. The coolant such as a liquid metal flows in from a coolant inlet 8 of the entrance nozzle 4 and moves upward. Then, the coolant flows out from a coolant outlet 9 of the handling head 7.

The above-described configuration further includes peripheral flow suppressing members 12 for suppressing the flow of the coolant in a peripheral flow passage 11, which extends between peripheral fuel pins 1a and the wrapper tube 3 over a length corresponding to a major heat generation length of the fuel pins 1. In the above, the major heat generation length refers to a length range in the axial direction of the fuel pins 1, which stores a radioactive fuel material. In the example illustrated in FIG. 1, the range of the major heat generation length corresponds to the range from the lower pin support plate 5 to a grid 2a disposed at an approximately intermediate height position of the wrapper tube 3. In the range from the grid 2a located at the intermediate height position to the upper pin support plate 6, a gas plenum is formed. Therefore, this range is outside the range of the heat generation length.

Each of the peripheral flow suppressing members 12 is formed by a plurality of blocks 13 provided in the peripheral flow passage 11 (FIG. 1 illustrates only a right half of each of the blocks 13). The block 13 is configured to have such a cross section that reduces the flow passage area of the peripheral flow passage 11 to be approximately equal to the flow passage area of a region on the center side from the peripheral fuel pins 1a. Further, the blocks 13 are configured to be stacked in the vertical direction to keep the relative positions in the axial direction of the grids 2 in accordance with the settings of the vertical thickness and the number of stacks of the blocks 13.

Each of the peripheral fuel pins 1a of a predetermined number is provided with a sleeve 14 at a portion thereof outside the range of the heat generation length such that the sleeve 14 covers the fuel pin 1a and keeps the relative position between the corresponding grids 2. Furthermore, a lower portion of the handling head 7 is provided with a spring 15 for pressing down one of the sleeves 14 disposed at the uppermost positions. Thus, the sleeves 14, the grids 2 and the blocks 13 are pressed and held from the upper side by the spring 15 with elastic force.

Figure 2:
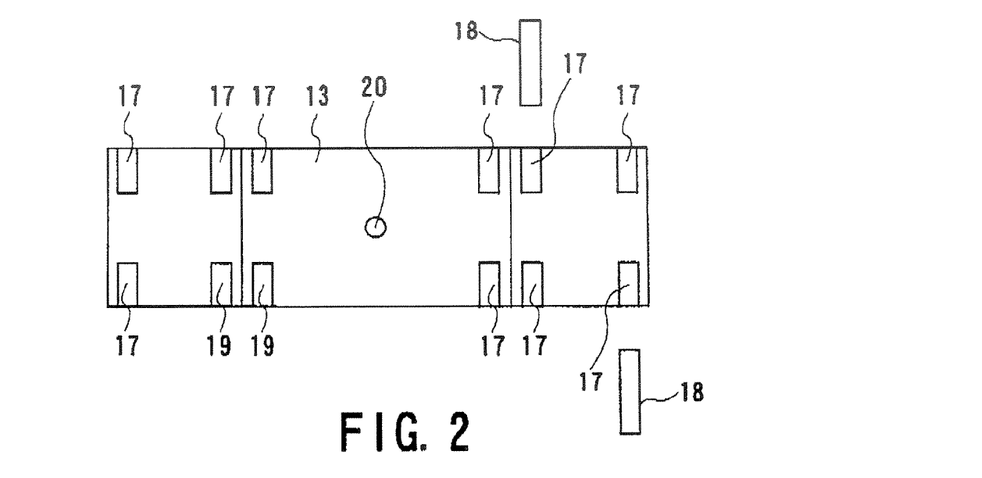
FIG. 2 is an enlarged view illustrating a block of the fuel assembly illustrated in FIG. 1.
Figure 3:
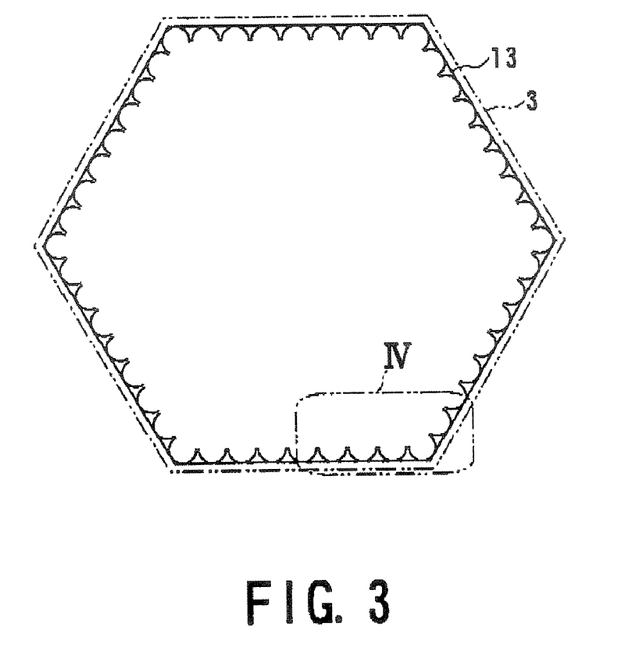
FIG. 3 is a plan view of FIG. 2.
Figure 4:
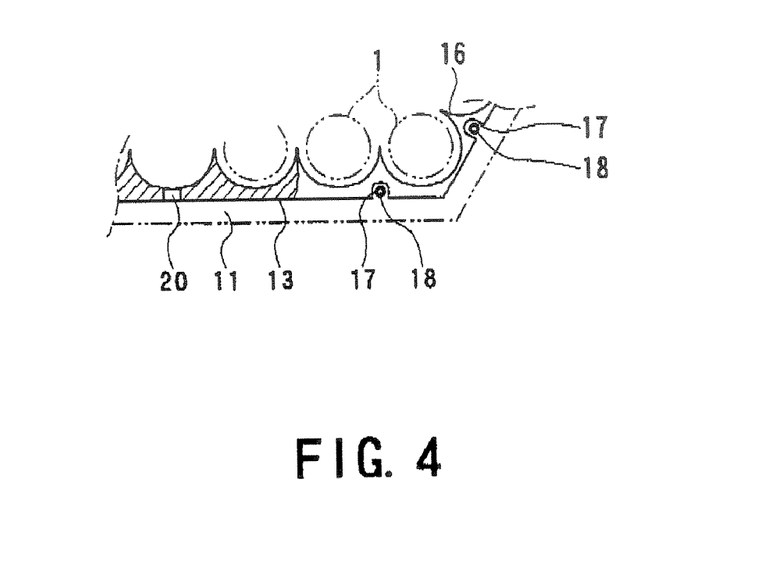
FIG. 4 is an enlarged view of the IV section illustrated in FIG. 3.

With reference to FIGS. 2 to 4, the configuration of the blocks 13 will now be described in detail. FIG. 2 is a side view illustrating an overall configuration of one of the blocks 13, and FIG. 3 is a plan view of FIG. 2. FIG. 4 is a partial cross-sectional view illustrating the IV section of FIG. 3 on an enlarged scale.

The block 13 has a predetermined vertical thickness as illustrated in FIG. 2 and has a regular hexagonal planar shape as illustrated in FIG. 3. The planar shape corresponds to the inner circumferential surface of the wrapper tube 3 indicated by a virtual line in FIG. 3. To obtain this shape, the block 13 is processed by wire electrical discharge processing, for example.

Figure 5:
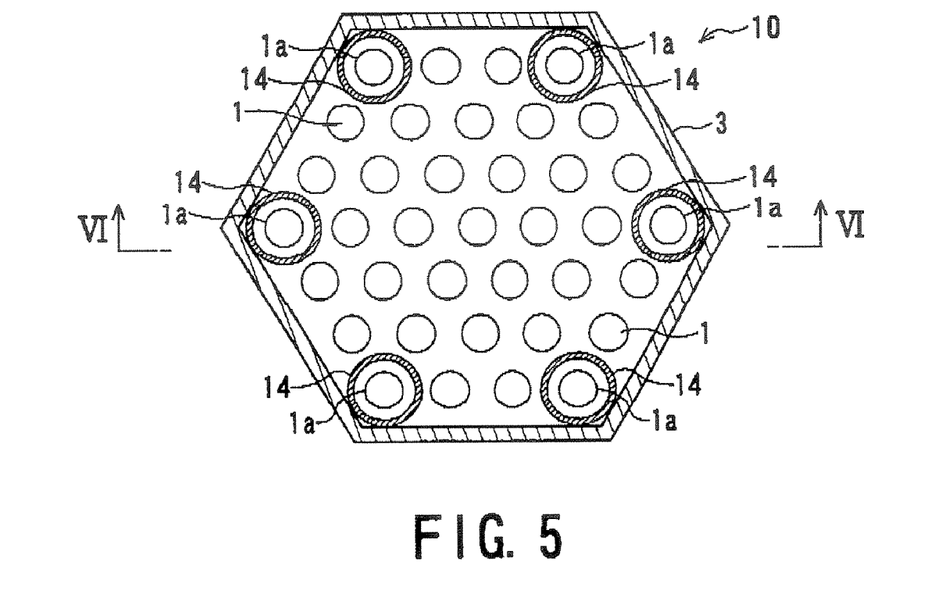
FIG. 5 is an enlarged cross-sectional view of FIG. 1 taken along the line V-V.

As illustrated in FIG. 3, the inner circumferential surface of the block 13 is formed with convexities 16 in the form of circular arcs in accordance with the outer circumferential surfaces of the fuel pins 1 held inside the block 13. As a configuration for providing a plurality of the fuel pins 1, the example of FIG. 3 illustrates a configuration in which each of the sides of the block 13 includes eight convexities 16 to hold the peripherally disposed ones of the fuel pins 1. FIG. 5 illustrates an example of a configuration in which the convexities 16 of the block 13 are omitted for simplification and four fuel pins 1 are disposed on each of the sides of the block 13.

As illustrated in FIGS. 2 and 4, both sides of each of the corners on the outer surface of the block 13 are provided with latch holes 17 formed by vertically extending groove holes, in which positioning pins are inserted. The vertically stacked blocks 13 are latched to the latch holes 17 inserted with latch pins 18. Accordingly, the blocks 13 can be positioned in the radial direction.

Further, as illustrated in FIGS. 2 and 4, the peripheral wall of the block 13 is formed with a coolant circulation hole 20 for communicating a coolant flow passage 19 on the inner circumferential side of the block 13 with the peripheral flow passage 11 on the outer circumferential side of the block 13. In the described configuration, therefore, the inner circumferential side and the outer circumferential side of the block 13 are communicated with each other through the coolant circulation hole 20, and the coolant freely flows through the coolant circulation hole 20 to thereby equalize the pressure of the coolant between the inner circumferential side and the outer circumferential side.

Figure 6:
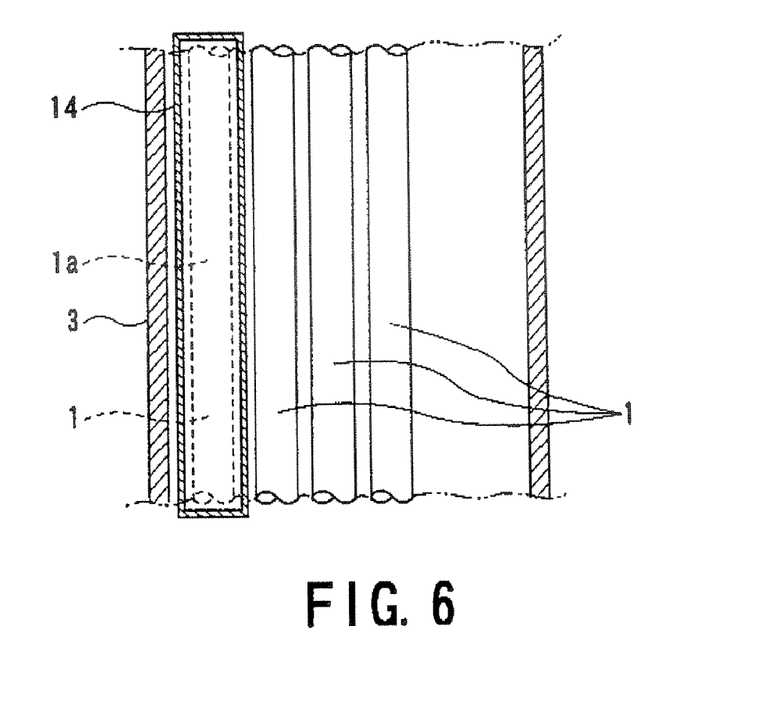
FIG. 6 is a cross-sectional view of FIG. 5 taken along the line VI-VI.

The configuration of the sleeves 14 will now be described with reference to FIGS. 1, 5, and 6. FIG. 5 is a cross-sectional view (i.e., a transverse cross-sectional view) of FIG. 1 taken along the line V-V, and FIG. 6 is a cross-sectional view (i.e., a vertical cross-sectional view) of FIG. 5 taken along the line VI-VI. As illustrated in FIG. 5, the sleeves 14 are larger in diameter than the fuel pins 1 and disposed on the inner circumferential side of the respective corners of the wrapper tube 3. For example, the sleeves 14 are installed in a disposition in contact with the corners on the inner surface of the wrapper tube 3, while being fitted to cover portions of six peripheral fuel pins 1a outside the range of the heat generation length. As illustrated in FIG. 1, each of the sleeves 14 is set to have a predetermined length in the axial direction (i.e., a vertical length) for keeping the relative positions between the corresponding grids 2. The relative positions between the vertically disposed grids 2 can be kept by making the upper and lower ends of the sleeve 14 in contact with the grids 2. In FIG. 5, six sleeves 14 are disposed at the corners. However, at least three sleeves 14 can sufficiently keep the relative positions between the grids 2.

Figure 7:
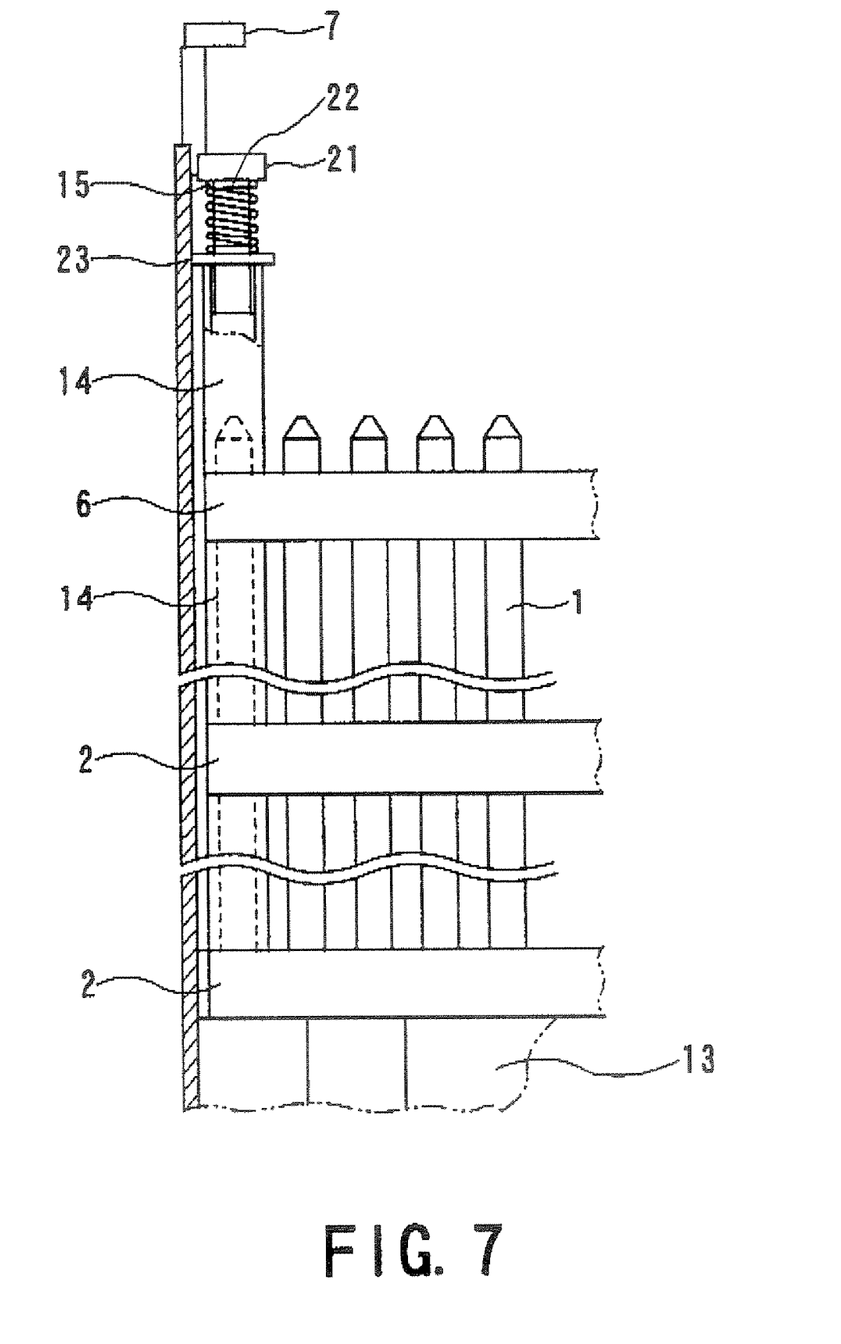
FIG. 7 is an enlarged view of the VII section illustrated in FIG. 1.

FIG. 7 illustrates an enlarged view of the configuration of the spring 15 which presses down the uppermost sleeve 14. As illustrated in FIG. 7, an upper spring retainer 21 is provided at a lower end position of the handling head 7, and a retaining rod 22 perpendicularly projects downward from the center of the lower surface of the upper spring retainer 21. The retaining rod 22 is inserted in an upper end portion of the uppermost disposed sleeve 14. Further, the above-described spring 15, such as a compression coil spring, for example, is provided around the retaining rod 22 to generate the downward pressing force. Meanwhile, the upper end of the uppermost sleeve 14 is provided with a spring bearing member 23 to receive the downward pressing force applied by the spring 15.

As described above, in the present configuration, the handling head 7 is provided with the retaining rod 22, and the sleeve 14 is pressed downward via the spring 15 and the spring bearing member 23. Thereby, the peripheral flow preventing blocks 13, the sleeves 14, and the grids 2 are pressed and held downward. That is, as a device for keeping the relative positions between the grids 2 in the range outside the range of the heat generation length, the sleeves 14 larger in diameter than the fuel pins 1 are fitted to cover the fuel pins 1. Therefore, it is possible to press and hold the grids 2 and the like with the elastic force via the sleeves 14 and the spring 5 without interrupting the expansion in the axial direction of the fuel pins 1. Accordingly, the sleeves 14, the grids 2 and the blocks 13 can be pressed and held from the above with the elastic force.

As described above, in the present configuration, each of the peripheral flow suppressing members 12 is formed by the blocks 13, which are disposed in the peripheral flow passage 11 formed in the gap between the wrapper tube 3 and the peripheral fuel pins 1a facing the wrapper tube 3, and each of which has the cross section that reduces the flow passage area of the peripheral flow passage 11 to be approximately equal to the flow passage area of the region surrounded by the centrally disposed ones of the fuel pins 1 forming a triangular array. Further, the blocks 13 are stacked to keep the relative positions in the axial direction of the grids 2. Furthermore, to keep regular intervals between the positions in the axial direction of the grids 2 that hold the fuel pins 1 at regular intervals, a plurality of the peripheral flow preventing blocks 13 are stacked between adjacent ones of the grids 2 in a heat generation unit of the reactor core to keep the grids 2 at predetermined positions. In addition, to suppress the peripheral flow, a part of each of the blocks 13 in contact with the fuel pins 1 is formed into such a shape that follows the shapes of the fuel pins 1 to close the flow passage along the fuel pins 1 facing the wrapper tube 3. Further, each of the blocks 13 is drilled with the coolant circulation hole 20 for communicating the gap formed between the wrapper tube 3 and the block 13 with the space inside the block 13. Thereby, a difference in pressure is eliminated between the space inside the block 13 and the gap formed between the wrapper tube 3 and the block 13, so that the deformation of the block 13 is prevented.

Further, in the present configuration, as the device for keeping the relative positions between the grids 2 in the range outside the range of the heat generation length, the sleeves 14 larger in diameter than the fuel pins 1 are fitted to cover the fuel pins 1 for supporting the grids 2. Furthermore, the grids 2, the sleeves 14 and the blocks 13 are held while being pressed from the upper side via the spring 15 supported by the handling head 7.

As described above, according to the present embodiment, it is possible to prevent an unnecessary flow of the coolant in an outer circumferential area in the fuel assembly and also possible to cause the coolant to effectively flow toward the interiorly disposed ones of the fuel pins. Further, the grids are fixed at appropriate positions in the axial direction by the peripheral flow suppressing members, each of which is formed by the peripheral flow preventing blocks or the like. Furthermore, the peripheral flow is suppressed, and the temperature distribution in the fuel assembly is planarized to suppress fuel cladding temperature. Accordingly, the lifetime of the fuel can be extended.

Further, in such a configuration that the grids, the peripheral flow preventing blocks, and the sleeves are pressed from the direction of the handling head without interrupting the expansion in the axial direction of the fuel pins, it is possible to prevent the fuel pins from being applied with the load for pressing the components.

The present invention is not limited to the embodiments described above, but other alterations and modifications can be made as long as not departing from the scope of the appended claims of the invention.

What is claimed is:

1. A fuel assembly charged in a reactor core of a nuclear reactor using a liquid metal as a coolant, the fuel assembly comprising:
   a vertically disposed wrapper tube including an entrance nozzle at a lower end that introduces the coolant and an operation handling head at an upper end, the wrapper tube stores a plurality of fuel pins;
   grids that support the plurality of fuel pins in the wrapper tube in a radial direction of the wrapper tube; and
   peripheral flow suppressing members, formed by a plurality of blocks, each block being a unitary structure extending around all fuel pins disposed on the periphery and controlling a flow of the coolant, the peripheral flow suppressing members being disposed in a peripheral flow passage between fuel pins disposed on the periphery of the fuel assembly and the wrapper tube, and extending over a length corresponding to a heat generation length, wherein the heat generation length corresponds to a length in the axial direction of the fuel pins storing a radioactive fuel material, and the blocks having an inner circumferential surface formed as a plurality of convexities, each of the convexities having a same focus and a larger radius as the respective fuel pin disposed on the periphery of the fuel assembly, wherein the radii of the convexities is determined such that a lateral cross sectional area of a first flow passage is substantially equal to a lateral cross sectional area of a second flow passage, the first flow passage being a flow passage disposed outside of a boundary line formed by a line drawn through the foci of the fuel pins disposed on the periphery of the fuel assembly, the lateral cross sectional area of the first flow passage being an area located outside of the boundary line and between outer circumferential portions of each of the fuel pins disposed on the periphery of the fuel assembly and the convexities formed on the inner circumferential surface of the blocks, and the lateral cross sectional area of the second flow passage being determined as an area located inside the boundary line and not occupied by the fuel pins.

2. The fuel assembly according to claim 1, wherein each of the blocks is disposed in the peripheral flow passage to reduce the lateral cross sectional area of the first flow passage.

3. The fuel assembly according to claim 2, wherein the blocks are stacked along an axial direction of the grids, and groups of the stacked blocks keep relative positions in the axial direction of the grids.

4. The fuel assembly according to claim 2, wherein the blocks are disposed in a ring shape at an inner circumferential surface of the wrapper tube and a coolant circulation hole is formed through each of the blocks to form a coolant flow passage that passes from the inner circumferential surface of the block to an outer circumferential side of the block.

5. The fuel assembly according to claim 1, further comprising sleeves disposed to cover the outer circumferential portions of each of the fuel pins disposed on the periphery of the fuel assembly within a range of a gas plenum of each fuel pin and to keep relative positions between the grids.

6. The fuel assembly according to claim 5, wherein a lower portion of the operation handling head is provided with a spring for pressing down one of the sleeves, a downward pressing force of the spring presses and holds the grids and the peripheral flow suppressing members from an upper side via the sleeve with an elastic force.

* * * * *